United States Patent
Tan et al.

(10) Patent No.: US 11,069,286 B2
(45) Date of Patent: Jul. 20, 2021

(54) COLOR COMPENSATION METHOD, COMPENSATION DEVICE, AND DISPLAY DEVICE

(71) Applicant: BOE TECHNOLOGY GROUP CO., LTD., Beijing (CN)

(72) Inventors: Wenjing Tan, Beijing (CN); Hongli Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/621,918

(22) PCT Filed: Dec. 27, 2018

(86) PCT No.: PCT/CN2018/124445
§ 371 (c)(1),
(2) Date: Dec. 12, 2019

(87) PCT Pub. No.: WO2019/153941
PCT Pub. Date: Aug. 15, 2019

(65) Prior Publication Data
US 2020/0135098 A1    Apr. 30, 2020

(30) Foreign Application Priority Data

Feb. 9, 2018    (CN) .......................... 201810135947.1

(51) Int. Cl.
*G09G 3/3225* (2016.01)
*G09G 3/20* (2006.01)
(Continued)

(52) U.S. Cl.
CPC ......... *G09G 3/3225* (2013.01); *G09G 3/2003* (2013.01); *H04N 5/372* (2013.01); *G06F 3/14* (2013.01)

(58) Field of Classification Search
CPC .............. G09G 2360/16; G09G 5/026; G09G 2300/0452; G09G 3/2003; G09G 3/3208;
(Continued)

(56) References Cited

U.S. PATENT DOCUMENTS 4,491,863 A    1/1985 Kurahashi
4,652,912 A    3/1987 Masubuchi
(Continued)

FOREIGN PATENT DOCUMENTS

CN    101192382 A    6/2008
CN    102201430 A    9/2011
(Continued)

OTHER PUBLICATIONS

International Search Report of PCT/CN2018/124445 in Chinese, dated Mar. 21, 2019, with English translation.
(Continued)

*Primary Examiner* — Charles V Hicks
(74) *Attorney, Agent, or Firm* — Collard & Roe, P.C.

(57) ABSTRACT

A color compensation method, a compensation device, and a display device. The color compensation method includes: a modeling phase including: obtaining color cast brightness of a first sub-pixel group (100) at a boundary of a display image in a display panel upon different gray levels being input; obtaining a first initial gray level of the first sub-pixel group (100); compensating the color cast brightness to obtain compensation brightness; obtaining a compensation gray level corresponding to the compensation brightness; and establishing a correspondence between the first initial gray level and the compensation gray level.

16 Claims, 4 Drawing Sheets

(51) Int. Cl.
  *H04N 5/372* (2011.01)
  *G06F 3/14* (2006.01)
(58) Field of Classification Search
  CPC .......... G09G 3/3225; G09G 2320/0242; G06F 3/14; H04N 5/372
  See application file for complete search history.

(56) References Cited

U.S. PATENT DOCUMENTS

| | | |
|---|---|---|
| 5,113,274 A | 5/1992 | Takahashi et al. |
| 5,341,153 A | 8/1994 | Benzschawel et al. |
| 6,768,482 B2 | 7/2004 | Asano et al. |
| 6,950,115 B2 | 9/2005 | Brown Elliot |
| 7,663,299 B2 | 2/2010 | Chao et al. |
| 7,733,359 B1 | 6/2010 | Hagge et al. |
| 8,159,508 B2 | 4/2012 | Lee |
| 8,330,352 B2 | 12/2012 | Sung et al. |
| 8,363,072 B2 | 1/2013 | Hong et al. |
| 8,446,435 B2 | 5/2013 | Tomizawa et al. |
| 8,754,913 B2 | 6/2014 | Hwang et al. |
| 9,343,511 B1 | 5/2016 | Feng |
| 9,424,771 B2 | 8/2016 | Gong |
| 9,704,926 B2 | 7/2017 | Kim |
| 9,818,803 B2 | 11/2017 | Lee |
| 9,871,085 B2 | 1/2018 | Cho et al. |
| 9,905,604 B2 | 2/2018 | Murata |
| 9,946,123 B2 | 4/2018 | Huangfu et al. |
| 9,984,624 B2 | 5/2018 | Takahashi et al. |
| 10,274,654 B2 | 4/2019 | Jin et al. |
| 2005/0018110 A1 | 1/2005 | Liu |
| 2007/0205423 A1 | 9/2007 | Yamazaki et al. |
| 2008/0001525 A1 | 1/2008 | Chao et al. |
| 2009/0121983 A1 | 5/2009 | Sung et al. |
| 2009/0302331 A1 | 12/2009 | Smith et al. |
| 2011/0127506 A1 | 6/2011 | So |
| 2011/0128262 A1 | 6/2011 | Chaji et al. |
| 2011/0234550 A1 | 9/2011 | Hong et al. |
| 2011/0260951 A1 | 10/2011 | Hwang et al. |
| 2011/0291549 A1 | 12/2011 | Mitragotri et al. |
| 2012/0039034 A1 | 2/2012 | Jepsen et al. |
| 2012/0092238 A1 | 4/2012 | Hwang et al. |
| 2012/0313844 A1 | 12/2012 | Im et al. |
| 2013/0234917 A1 | 9/2013 | Lee |
| 2014/0003045 A1 | 1/2014 | Lee et al. |
| 2014/0198479 A1 | 7/2014 | Chao et al. |
| 2014/0226323 A1 | 8/2014 | Huang et al. |
| 2014/0252321 A1 | 9/2014 | Pyon et al. |
| 2014/0292622 A1 | 10/2014 | Lee |
| 2015/0015465 A1 | 1/2015 | Gong |
| 2015/0021637 A1 | 1/2015 | Ahn et al. |
| 2015/0102320 A1 | 4/2015 | Jung |
| 2015/0162394 A1 | 6/2015 | Tokuda et al. |
| 2015/0270317 A1 | 9/2015 | Lee et al. |
| 2015/0364525 A1 | 12/2015 | Lin et al. |
| 2016/0049438 A1 | 2/2016 | Murata |
| 2016/0126296 A1 | 5/2016 | Feng |
| 2016/0126298 A1 | 5/2016 | Chen |
| 2016/0155781 A1 | 6/2016 | Chaji |
| 2016/0171918 A1 | 6/2016 | Kim et al. |
| 2016/0190523 A1 | 6/2016 | Kim et al. |
| 2016/0196776 A1 | 7/2016 | Yang et al. |
| 2016/0253943 A1 | 9/2016 | Wang |
| 2016/0293678 A1 | 10/2016 | Wang |
| 2016/0343284 A1 | 11/2016 | Sun |
| 2016/0351119 A1 | 12/2016 | Ono |
| 2016/0357076 A1 | 12/2016 | Huangfu et al. |
| 2016/0358985 A1 | 12/2016 | Bai et al. |
| 2016/0370919 A1 | 12/2016 | Xu et al. |
| 2017/0193880 A1 | 7/2017 | Lee et al. |
| 2017/0294491 A1 | 10/2017 | Jo et al. |
| 2017/0317150 A1 | 11/2017 | Chung et al. |
| 2017/0352710 A1 | 12/2017 | Hong et al. |
| 2018/0012547 A1 | 1/2018 | Li et al. |
| 2018/0088260 A1 | 3/2018 | Jin et al. |
| 2018/0097043 A1 | 4/2018 | Song |
| 2018/0247984 A1 | 8/2018 | Wang et al. |
| 2018/0292695 A1 | 10/2018 | You et al. |
| 2018/0308907 A1 | 10/2018 | Jin et al. |
| 2019/0035859 A1 | 1/2019 | Kang et al. |
| 2019/0066564 A1 | 2/2019 | Tan |
| 2019/0115399 A1 | 4/2019 | Jo et al. |
| 2019/0206341 A1* | 7/2019 | Liao .......................... G09G 3/00 |
| 2019/0237518 A1 | 8/2019 | Sun et al. |
| 2020/0035172 A1* | 1/2020 | Chen .................... G09G 3/3611 |

FOREIGN PATENT DOCUMENTS

| | | |
|---|---|---|
| CN | 104037202 A | 9/2014 |
| CN | 104051493 A | 9/2014 |
| CN | 104269411 A | 1/2015 |
| CN | 104282727 A | 1/2015 |
| CN | 104332486 A | 2/2015 |
| CN | 104362170 A | 2/2015 |
| CN | 104597655 A | 5/2015 |
| CN | 104701341 A | 6/2015 |
| CN | 104795431 A | 7/2015 |
| CN | 104882464 A | 9/2015 |
| CN | 105280139 A | 1/2016 |
| CN | 205231065 U | 5/2016 |
| CN | 205355055 U | 6/2016 |
| CN | 205608350 U | 9/2016 |
| CN | 205845956 U | 12/2016 |
| CN | 106601167 A | 4/2017 |
| CN | 106782307 A | 5/2017 |
| CN | 104597655 B | 6/2017 |
| CN | 106935618 A | 7/2017 |
| CN | 106935630 A | 7/2017 |
| CN | 107248378 A | 10/2017 |
| CN | 107275359 A | 10/2017 |
| CN | 107393468 A | 11/2017 |
| CN | 107644888 A | 1/2018 |
| CN | 107665684 A | 2/2018 |
| CN | 107817632 A | 3/2018 |
| CN | 107910348 A | 4/2018 |
| CN | 207781607 U | 8/2018 |
| CN | 207781608 U | 8/2018 |
| CN | 207883217 U | 9/2018 |
| EP | 2 680 310 A1 | 1/2014 |
| EP | 2 709 155 A1 | 3/2014 |
| EP | 3 270 216 A1 | 1/2018 |
| JP | 2002221917 A | 8/2002 |
| JP | 2005-091875 A | 4/2005 |
| JP | 2008015521 A | 1/2008 |
| JP | 2016090991 A | 5/2016 |
| KR | 20090049515 A | 5/2009 |
| KR | 10-2011-0108050 A | 10/2011 |
| KR | 10-2013-0101874 A | 9/2013 |
| KR | 10-1347995 B1 | 1/2014 |
| KR | 10-2015-0006668 A | 1/2015 |
| KR | 10-2016-0051511 A | 5/2016 |
| WO | 2017140038 A1 | 8/2017 |

OTHER PUBLICATIONS

Chinese Office Action in Chinese Application No. 201810135947.1, dated Mar. 3, 2020 with English translation.
International Search Report of PCT/CN2018/124890 in Chinese, dated Mar. 27, 2019 with English translation.
International Search Report of PCT/CN2018/124881 in Chinese, dated Mar. 26, 2019, with English translation.
International Search Report of PCT/CN2018/124884 in Chinese, dated Mar. 27, 2019, with English translation.
International Search Report of PCT/CN2018/124404 in Chinese, dated Mar. 14, 2019, with English translation.
International Search Report of PCT/CN2016/081097 in Chinese, dated Nov. 16, 2016, with English translation.
International Preliminary Report on Patentability of PCT/CN2016/081097, issuance date Aug. 21, 2018 and Written Opinion of the International Searching Authority of PCT/CN20161081097 in Chinese, dated Nov. 16, 2016 with English translation.
First Office Action in U.S. Appl. No. 15/536,347 dated Aug. 28, 2018.

(56) References Cited

OTHER PUBLICATIONS

English translation of the International Search Report of PCT/CN2017/075957, dated Jun. 8, 2017.
International Preliminary Report on Patentability of PCT/CN2017/075957, issuance date Jan. 22, 2019 and English Translation of the Written Opinion of the International Searching Authority of PCT/CN2017/075957, dated Jun. 8, 2017.
Indian Office Action in Indian Application No. 201717038562, dated Oct. 15, 2019.
First Office Action in U.S. Appl. No. 15/578,481 dated Feb. 1, 2019.
Second Office Action in U.S. Appl. No. 15/578,481 dated Jul. 11, 2019.
English translation of Extended European Search Report in EP Application No. 17768339.8 dated Dec. 6, 2019.
Korean Office Action in Korean Application No. 10-2017-7022698, dated May 29, 2019 with English translation.
Korean Written Decision on Registration in Korean Application No. 10-2017-7022698, dated Mar. 6, 2020 with English translation.
Brown Elliot, Reducing Pixel Count without Reducing Image Quality, Information Display, vol. 12, 1999, pp. 22-25 (4 pages).
Fang et al., "Subpixel Rendering: From Font Rendering to Image Subsampling", IEEE Signal Processing Magazine, May 2013, pp. 177-182 and 189 (7 pages).
Messing et al., "Improved Display Resolution of Subsampled Colour Images Using Subpixel Addressing", IEEE ICIP, vol. 6, No. 2, 2002, pp. 625-628 (4 pages).
Huang et al., "RGB to RGBG conversion algorithm based on weighting factors and related FPGA realization", Chinese Journal of Liquid Crystals and Displays, China Academic Journal Electronic Publishing House, vol. 32, No. 7, Jul. 2017, pp. 572-579 (8 pages) with English Abstract.
First Japanese Office Action in Japanese Application No. 2017-544608, dated Oct. 19, 2020 with English translation.
First Korean Office Action in Korean Application No. 10-2019-7027773, dated Dec. 25, 2020 with English translation.
First Office Action in U.S. Appl. No. 16/492,930, dated Jul. 24, 2020.
First Korean Office Action in Korean Application No. 10-2019-7024785, dated Jul. 30, 2020 with English translation.
Notice of Allowance in U.S. Appl. No. 16/234,777, dated Sep. 1, 2020.
First Office Action in U.S. Appl. No. 16/600,316, dated Oct. 6, 2020.
Chinese Search Report in PCT/CN2019/098705, dated May 6, 2020 in Chinese.
Notice of Allowance in U.S. Appl. No. 16/600,316 dated Apr. 14, 2021.
Notice of Allowance in U.S. Appl. No. 16/630,496 dated Mar. 26, 2021.
Extended European Search Report in European Application No. 21152119.0 dated May 11, 2021 in English.

* cited by examiner

COLOR COMPENSATION METHOD, COMPENSATION DEVICE, AND DISPLAY DEVICE

CROSS REFERENCE TO RELATED APPLICATIONS

This application is the National Stage of PCT/CN2018/124445 filed on Dec. 27, 2018, which claims priority under 35 U.S.C. § 119 of Chinese Application No. 201810135947.1 filed on Feb. 9, 2018, the disclosure of which is incorporated by reference.

TECHNICAL FIELD

At least one embodiment of the present disclosure relates to a color compensation method, a compensation device, and a display device.

BACKGROUND

Organic light-emitting diode (OLED) devices have become competitive and promising next-generation display devices because of a series of advantages such as the all-solid-state structure, high brightness, full viewing angle, fast responding speed, flexible display, etc. The pixel arrangement in the organic light-emitting diode includes a Pentile arrangement. The Pentile arrangement is implemented by sharing sub-pixels between pixels, and can reduce the density of physical sub-pixels, thereby reducing the process difficulty in manufacturing the display device, improving the yield, and reducing the cost.

SUMMARY

At least one embodiment of the present disclosure provides a color compensation method, a compensation device, and a display device.

At least one embodiment of the present disclosure provides a color compensation method, including: a modeling phase. The modeling phase includes: obtaining color cast brightness of a first sub-pixel group at a boundary of a display image in a display panel upon different gray levels being input; obtaining a first initial gray level of the first sub-pixel group; compensating the color cast brightness to obtain compensation brightness; obtaining a compensation gray level corresponding to the compensation brightness; and establishing a correspondence between the first initial gray level and the compensation gray level.

For example, in some examples, the first sub-pixel group includes a plurality of sub-pixels of at least one color in one row.

For example, in some examples, compensating the color cast brightness to obtain the compensation brightness, includes: reducing brightness of the first sub-pixel group until color cast of the boundary of the display image is corrected; and reduced brightness of the first sub-pixel group is the compensation brightness.

For example, in some examples, a value of the compensation brightness is equal to a value of the color cast brightness.

For example, in some examples, obtaining the compensation gray level corresponding to the compensation brightness, includes: adjusting the first initial gray level to a first corrected gray level to allow the brightness of the first sub-pixel group to be reduced by the compensation brightness; and the compensation gray level is a difference between the first initial gray level and the first corrected gray level.

For example, in some examples, compensating the color cast brightness to obtain the compensation brightness, includes: adjusting brightness of a second sub-pixel group, outside the display image and adjacent to the first sub-pixel group, until color cast of the boundary of the display image is corrected; enhanced brightness of the second sub-pixel group is the compensation brightness; and the second sub-pixel group comprises one row of sub-pixels, and the one row of sub-pixels have a color complementary to a color of the plurality of sub-pixels in the first sub-pixel group.

For example, in some examples, a first central line formed by brightness centers of the sub-pixels in the first sub-pixel group and a second central line formed by brightness centers of the sub-pixels in the second sub-pixel group do not coincide.

For example, in some examples, a value of the color cast brightness is L1, a value of the compensation brightness is L2, and a relationship between L2 and L1 is: $L2=K*L1$, where K is a value calculated according to a proportional relationship of red sub-pixels, green sub-pixels and blue sub-pixels in a case where the red sub-pixels, the green sub-pixels and the blue sub-pixels provide a white color.

For example, in some examples, obtaining the compensation gray level corresponding to the compensation brightness, includes: adjusting a second initial gray level of the second sub-pixel group to a second corrected gray level to allow the brightness of the second sub-pixel group to be increased by the compensation brightness; and the compensation gray level is a difference between the second corrected gray level and the second initial gray level.

For example, in some examples, establishing the correspondence between the first initial gray level and the compensation gray level includes: fitting the first initial gray level and the compensation gray level to obtain a compensation function.

For example, in some examples, establishing the correspondence between the first initial gray level and the compensation gray level, includes: allowing the first initial gray level and the compensation gray level to be in a one-to-one correspondence to establish a look-up table.

For example, in some examples, the modeling phase further includes: writing the correspondence into an integrated circuit of the display panel.

For example, in some examples, the color compensation method further includes a compensation phase. The compensation phase includes: detecting the boundary of the display image in the display panel and the first initial gray level of the first sub-pixel group at the boundary; obtaining the compensation gray level corresponding to the first initial gray level according to the correspondence; and adjusting the first initial gray level to reduce the compensation gray level.

For example, in some examples, the color compensation method further includes a compensation phase. The compensation phase includes: detecting the boundary of the display image in the display panel and the first initial gray level of the first sub-pixel group at the boundary; obtaining the compensation gray level corresponding to the first initial gray level according to the correspondence; and adjusting the second initial gray level of the second sub-pixel group to increase the compensation gray level.

For example, in some examples, detecting the boundary of the display image in the display panel, includes: setting a boundary gray level threshold; detecting an input gray level of each row of sub-pixels in the display image; and comparing the input gray level with the boundary gray level threshold, and determining one row of the sub-pixels as the boundary of the display image in a case where the input gray level corresponding to the row of sub-pixels is less than the boundary gray level threshold.

For example, in some examples, detecting the boundary of the display image in the display panel, includes: detecting input gray levels of two adjacent rows of sub-pixels in the display image, where an input gray level of a first row of the sub-pixels is a first gray level, and an input gray level of a second row of the sub-pixels is a second gray level; and comparing the first gray level with the second gray level, and determining the second row of sub-pixels corresponding to the second gray level as the boundary of the display image in a case where the first gray level is 0 and the second gray level is not 0.

For example, in some examples, the display panel includes a pixel arrangement structure, the pixel arrangement structure includes a plurality of first color sub-pixels, a plurality of second color sub-pixels, and a plurality of third color sub-pixels, the first color sub-pixels and the second color sub-pixels are in an identical row, and the third color sub-pixels constituting pixels with at least part of the plurality of first color sub-pixels and at least part of the plurality of second color sub-pixels in the identical row, are in another row.

For example, in some examples, the plurality of first color sub-pixels, the plurality of second color sub-pixels, and the plurality of third color sub-pixels are arranged as a plurality of first repeating units and a plurality of second repeating units; each of the plurality of first repeating units comprises one of the plurality of first color sub-pixels and one of the plurality of third color sub-pixels, and each of the second repeating units comprises one of the plurality of second color sub-pixels and one of the plurality of third color sub-pixels; the plurality of first repeating units and the plurality of second repeating units are in an alternate arrangement along a first direction and a second direction, respectively, and the first direction intersects the second direction; the plurality of first color sub-pixels and the plurality of second color sub-pixels are in an alternate arrangement along the first direction and the second direction, respectively; and the plurality of third color sub-pixels are in an array arrangement along the first direction and the second direction, and every four of the plurality of third color sub-pixels are around one of the plurality of first color sub-pixels or one of the plurality of second color sub-pixels, where the first sub-pixel group comprises one row of the plurality of first color sub-pixels and the plurality of second color sub-pixels in an alternate arrangement, or comprises one row of the plurality of third color sub-pixels.

For example, in some examples, the plurality of first color sub-pixels, the plurality of second color sub-pixels, and the plurality of third color sub-pixels are arranged as a plurality of first repeating units and a plurality of second repeating units; each of the plurality of first repeating units comprises one of the plurality of first color sub-pixels and one of the plurality of third color sub-pixels, and each of the second repeating units comprises one of the plurality of second color sub-pixels and one of the plurality of third color sub-pixels; the plurality of first repeating units and the plurality of second repeating units are in an alternate arrangement along a first direction to form a plurality of repeating unit groups, the plurality of repeating unit groups are arranged along a second direction, adjacent repeating unit groups in the plurality of repeating unit groups are staggered from each other along the first direction, and the first direction intersects the second direction; and in each of the plurality of repeating unit groups, the first color sub-pixel of each of the first repeating units, the second color sub-pixel and the third color sub-pixel of each of the second repeating units are in an identical row, and the third color sub-pixel of each of the first repeating units is in another row, where the first sub-pixel group comprises one row of the plurality of first color sub-pixels and the plurality of second color sub-pixels, or comprises one row of the plurality of third color sub-pixels.

At least one embodiment of the present disclosure further provides a compensation device, including: a memory, configured to store non-volatile computer readable instructions; and a processor, configured to execute the non-volatile computer readable instructions. The non-volatile computer readable instructions, when executed by the processor perform the color compensation method provided by any one of the embodiments of the present disclosure.

At least one embodiment of the present disclosure further provides a display device, including the compensation device provided by any one of the embodiments of the present disclosure.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the object which is described is changed, the relative position relationship may be changed accordingly.

Figure 1A:
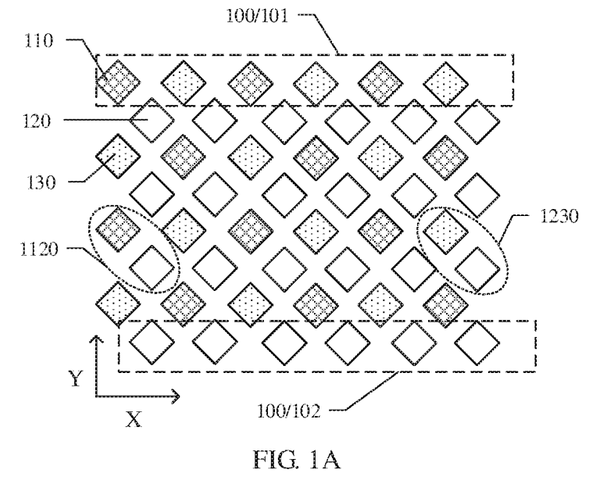
FIG. 1A is a schematic diagram of a pixel arrangement structure.
Figure 1B:
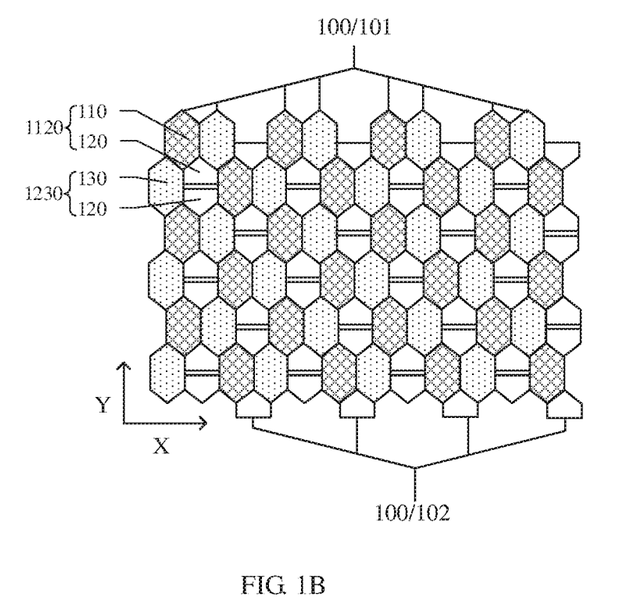
FIG. 1B is a schematic diagram of another pixel arrangement structure.

FIG. 1A is a schematic diagram of a pixel arrangement structure, and FIG. 1B is a schematic diagram of another pixel arrangement structure. As illustrated in FIG. 1A and FIG. 1B, the pixel arrangement structure includes a plurality of red sub-pixels 110 (the first color sub-pixels), a plurality of green sub-pixels 120 (the third color sub-pixels), and a plurality of blue sub-pixels 130 (the second color sub-pixels). Two adjacent green sub-pixels 120 illustrated in FIG. 1B form one green sub-pixel pair. Here, "adjacent" refers to a case where no other sub-pixels between the two green sub-pixels.

As illustrated in FIG. 1A, the first color sub-pixels 110 and the second color sub-pixels 130 are located in identical rows along the X direction and the Y direction, respectively, and the third color sub-pixels 120 constituting pixels with the first color sub-pixels 110 and the second color sub-pixels 130 in the identical row are located in another row. That is, the first color sub-pixels 110 and the second color sub-pixels 130 are in an alternate arrangement along the X (Y) direction to form a first sub-pixel row, the third color sub-pixels 120 are arranged along the X (Y) direction to form a second sub-pixel row, and the first sub-pixel row and the second sub-pixel row are in an alternate arrangement.

As illustrated in FIG. 1B, the first color sub-pixels 110 and the second color sub-pixels 130 arranged along the X direction are located in the same row, and the third color sub-pixels 120, comprised in one pixel comprising at least one of the first color sub-pixels 110 and the second color sub-pixels 130 in the same row, are located in another row.

In research, the inventors of the present application found that the brightness centers of the red sub-pixel, the green sub-pixel, and the blue sub-pixel which are arranged along the row (column) direction in the pixel arrangement structure are not in one central line. Upon providing images of mixed colors, centers of some sub-pixels usually protrude, thereby causing the color cast and affecting the visual experience.

For example, the pixel arrangement illustrated in FIG. 1A is taken as a display image, the first row of sub-pixels 101 arranged along the X direction includes the red sub-pixels 110 and the blue sub-pixels 130 in an alternate arrangement, and the sub-pixels 102 in the last row only include the green sub-pixels 120. The direction indicated by the arrow in the Y direction is taken as the upper direction, and at the upper boundary of the display image, the red sub-pixels 110 and the blue sub-pixels 130 protrude out of the display image relative to the green sub-pixels 120 in the second row. Therefore, centers of the red sub-pixels 110 and centers of the blue sub-pixels 130 protrude, which may result in color cast (displaying a color shifting to purple) at the upper boundary of the display image. At the lower boundary of the display image, the green sub-pixels 120 protrude out of the display image relative to the red sub-pixels 110 and the blue sub-pixels 130 adjacent to the green sub-pixels 120. Therefore, the centers of the green sub-pixels 120 protrude, which may result in a color cast (displaying a color shifting to green) at the lower boundary of the display image.

Similarly, for example, the pixel arrangement illustrated in FIG. 1B is taken as a display image, the first row of sub-pixels 101 arranged along the X direction includes the red sub-pixels 110 and the blue sub-pixels 130 in an alternate arrangement, that is, at the upper boundary of the display image, the red sub-pixels 110 and the blue sub-pixels 130 protrude out of the display image relative to the green sub-pixels 120 adjacent to the red sub-pixels 110 and the blue sub-pixels 130, thereby resulting in the color cast at the upper boundary of the display image.

The embodiments of the present disclosure provide a color compensation method, a compensation device, and a display device. The color compensation method includes a modeling phase. The modeling phase includes: obtaining color cast brightness of a first sub-pixel group at a boundary of a display image in a display panel upon different gray levels being input; obtaining a first initial gray level of the first sub-pixel group; compensating the color cast brightness to obtain compensation brightness; obtaining a compensation gray level corresponding to the compensation brightness; and establishing a correspondence between the first initial gray level and the compensation gray level. The color compensation method can perform real-time correction on the boundary of the display image where color cast occurs, thereby alleviating the phenomenon that a color shifts to green or purple at the boundary of the display image.

Hereinafter, the color compensation method, the compensation device, and the display device provided by the embodiments of the present disclosure are described with reference to the accompanying drawings.

Figure 2:
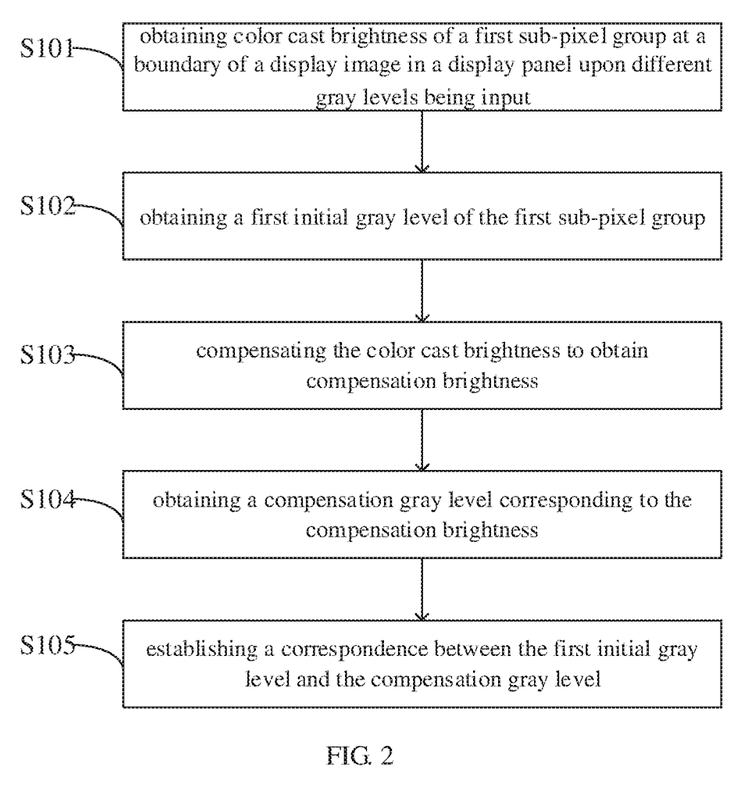
FIG. 2 is a schematic flowchart of steps of a color compensation method provided by an embodiment of the present disclosure.

FIG. 2 is a schematic flowchart of steps of a color compensation method provided by an embodiment of the present disclosure. As illustrated in FIG. 2, the color compensation method includes a modeling phase, and the modeling phase includes the following steps.

The step S101: obtaining color cast brightness of a first sub-pixel group at a boundary of a display image in a display panel upon different gray levels being input.

The step S102: obtaining a first initial gray level of the first sub-pixel group.

For example, the pixel arrangement structures illustrated in FIG. 1A and FIG. 1B are taken as a display image in a display panel, and the first sub-pixel group 100 includes one row of a plurality of sub-pixels of at least one color.

As illustrated in FIG. 1A, a plurality of first color sub-pixels 110, a plurality of second color sub-pixels 130, and a plurality of third color sub-pixels 120 are arranged as a plurality of first repeating units 1120 and a plurality of second repeating units 1230. Each of the first repeating units 1120 includes one first color sub-pixel 110 and one third color sub-pixel 120, and each of the second repeating units 1230 includes one second color sub-pixel 130 and one third color sub-pixel 120. The plurality of first repeating units 1120 and the plurality of second repeating units 1230 are in an alternate arrangement along the first direction (X direction) and the second direction (Y direction), and the first direction intersects the second direction, for example, the first direction is perpendicular to the second direction. The plurality of first color sub-pixels 110 and the plurality of second color sub-pixels 130 are in an alternate arrangement along the first direction and the second direction, respectively. The plurality of third color sub-pixels 120 are in an array arrangement along the first direction and the second direction, and every four third color sub-pixels 120 are around one first color sub-pixel 110 or one second color sub-pixel 130. The first sub-pixel group 100 includes one row of first color sub-pixels 110 and second color sub-pixels 130 in an alternate arrangement, or includes one row of third color sub-pixels 120.

For example, as illustrated in FIG. 1A, the first sub-pixel group 100 at the boundary of the display image in the present embodiments may refer to one row (that is, the first row of the display image) of the red sub-pixels 110 and the blue sub-pixels 130 in an alternate arrangement along the X direction at the upper boundary of the display image. In this case, the color cast brightness refers to the total brightness, except the brightness which forms the white light with the brightness of the green sub-pixel 120 located in the second row of the display image, of the first sub-pixel group 100, that is, the color cast brightness refers to the excessive brightness which causes the first sub-pixel group 100 to display a color shifting to purple.

For example, as illustrated in FIG. 1A, the first sub-pixel group 100 may also be a row of green sub-pixels 120 arranged along the X direction at the lower boundary of the display image (that is, the last row of the display image). In this case, the color cast brightness refers to the total brightness, except the brightness which forms the white light with the brightness of the red sub-pixels 110 and blue sub-pixels 130 located in the penultimate row of the display image, of the first sub-pixel group 100, that is, the color cast brightness refers to the excessive brightness which causes the first sub-pixel group 100 to display a color shifting to green.

It should be noted that, a case where the first sub-pixel group 100 is a sub-pixel group including one row of the sub-pixels arranged along a row direction is taken as an example to describe the present embodiments, but the present embodiments are not limited thereto. The first sub-pixel group 100 may also refer to a sub-pixel group including one row of sub-pixels arranged along a column direction. Here, the "first sub-pixel group located at the boundary of the display image in the display panel" means that the first sub-pixel group refers to the sub-pixels in the first row (column) or in the last row (column) of the display image.

Figure 1C:
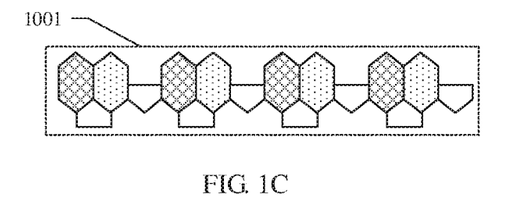
FIG. 1C is a schematic diagram of a repeating unit group of the pixel arrangement structure illustrated in FIG. 1B.

In addition, the color cast phenomenon generated by the pixel arrangement illustrated in FIG. 1A is taken as an example to describe the present disclosure, but the pixel arrangement structure is not limited thereto. For example, as illustrated in FIG. 1B and FIG. 1C, the plurality of first color sub-pixels 110, the plurality of second color sub-pixels 130 and the plurality of third color sub-pixels 120 are arranged as a plurality of first repeating units 1120 and a plurality of second repeating units 1230. Each of the first repeating units 1120 includes one first color sub-pixel 110 and one third color sub-pixel 120, and each of the second repeating units 1230 includes one second color sub-pixel 130 and one third color sub-pixel 120. The plurality of first repeating units 1120 and the plurality of second repeating units 1230 are alternately arranged in the first direction (X direction) to form a plurality of repeating unit groups 1001, the plurality of repeating unit groups 1001 are arranged along the second direction (Y direction), adjacent repeating unit groups 1001 in the plurality of repeating unit groups 1001 are staggered from each other along the first direction, and the first direction intersects the second direction, for example, the first direction is perpendicular to the second direction. In each of the repeating unit groups 1001, the first color sub-pixel 110 of the first repeating unit 1120, the second color sub-pixel 130 of the second repeating unit 1230, and the third color sub-pixel 120 of the second repeating unit 1230 are in the same row, and the third color sub-pixel 130 of the first repeating unit 1120 is in another row. The first sub-pixel group 100 includes one row of first color sub-pixels 110 and second color sub-pixels 130, or includes one row of third color sub-pixels 120.

It should be noted that as long as the sub-pixels, forming a white color, of different colors are arranged in different rows, respectively, that is, the brightness centers of the red sub-pixels, the green sub-pixels, and the blue sub-pixels arranged in the row (column) direction are not located in one central line, the pixel arrangement structure that satisfies this arrangement will appear the color cast phenomenon described above.

For example, obtaining the color cast brightness of the first sub-pixel group upon different gray levels being input, includes: selecting at least one display panel; performing a plurality of gray level input operations on the first sub-pixel group of the at least one display panel, where the input gray levels are different each time; and observing or detecting the color cast brightness of the first sub-pixel group by using the human eye or a CCD (charge-coupled device) camera.

It should be noted that the at least one display panel refers to at least one display panel produced in the same batch. In addition, a step of performing the plurality of gray level input operations on the first sub-pixel group of the display panel means that each operation is to input the gray level for the entire display panel, and at least ensures that the gray levels input for the first sub-pixel group are different each time to obtain different color cast brightness.

For example, upon obtaining the color cast brightness of the first sub-pixel group input with different gray levels, the actual input gray levels (that is, the first initial gray level) corresponding to different color cast brightness generated by the first sub pixel group are sampled, that is, the first initial gray levels, in one-to-one correspondence with different color cast brightness, of the first sub-pixel group are obtained.

As illustrated in FIG. 2, the modeling phase further includes the following steps.

The step S103: compensating the color cast brightness to obtain compensation brightness.

The step S104: obtaining a compensation gray level corresponding to the compensation brightness.

For example, in an example of the present embodiments, a step of compensating the color cast brightness to obtain compensation brightness includes: reducing brightness of the first sub-pixel group until color cast of the boundary of the display image is corrected, and reduced brightness of the first sub-pixel group is the compensation brightness.

Here, "reducing brightness of the first sub-pixel group" refers to reducing the overall brightness of the first sub-pixel group, so that the color cast at the boundary of the display image is corrected.

For example, the first sub-pixel group 100 may be the first row of the sub-pixels 101 illustrated in FIG. 1A and FIG. 1B. Because the first sub-pixel group 100 includes the red sub-pixels 110 and the blue sub-pixels 130 in an alternate arrangement, the color of the boundary where the first sub-pixel group 100 is located shifts to purple. In order to alleviate the color cast phenomenon at that location, the brightness of the first sub-pixel group 100 needs to be reduced, that is, the compensation brightness is the reduced brightness of the first sub-pixel group 100 in a case where the brightness of the first sub-pixel group 100 is reduced until the color cast at the boundary of the display image is corrected.

For example, the first sub-pixel group 100 may also be the last row of the sub-pixels 102 illustrated in FIG. 1A and FIG. 1B. Because the first sub-pixel group 100 includes a plurality of green sub-pixels 120, the color of the boundary where the first sub-pixel group 100 is located shifts to green. In order to alleviate the color cast phenomenon at that location, the brightness of the first sub-pixel group 100 needs to be reduced.

The above method for reducing the brightness of the first sub-pixel group 100 can allow the brightness of one row of the sub-pixels in the first sub-pixel group 100 to be exactly balance out the brightness of one row of sub-pixels located on a side near the center of the display image and have a color complementary to a color of sub-pixels in the first sub-pixel group 100, thereby correcting the color cast at the boundary of the display image. Here, "one row of sub-pixels have a color complementary to a color of sub-pixels in the first sub-pixel group 100" means that colors of the sub-pixels in the row and the color of the first sub-pixel group form a white color.

For example, whether the color cast at the boundary of the display image is corrected can be observed by the human eye, or can be photographed and detected by the CCD camera. The embodiments of the present disclosure are not limited thereto.

For example, the value L2 of the compensation brightness is equal to the value L1 of the color cast brightness, that is, by subtracting the color cast brightness from the total brightness of the first sub-pixel group 100, the region, where the first sub-pixel group 100 is located, of the display image no longer appears the color cast.

For example, a step of obtaining the compensation gray level corresponding to the compensation brightness in the above example includes: adjusting the first initial gray level to a first corrected gray level to allow the brightness of the first sub-pixel group to be reduced by the compensation brightness. The compensation gray level is a difference between the first initial gray level and the first corrected gray level.

For example, the first corrected gray level is the gray level corresponding to the brightness, subsequent to being reduced by the compensation brightness, of the first sub-pixel group, and the first corrected gray level can be obtained by detection.

For example, the value of the compensation gray level can be reduced by adjusting the first initial gray level of the first sub-pixel group, thereby allowing the brightness of the first sub-pixel group to be adjusted from the color cast brightness to the corrected brightness. The compensation gray level described above is also in one-to-one correspondence with the compensation brightness.

Figure 3A:
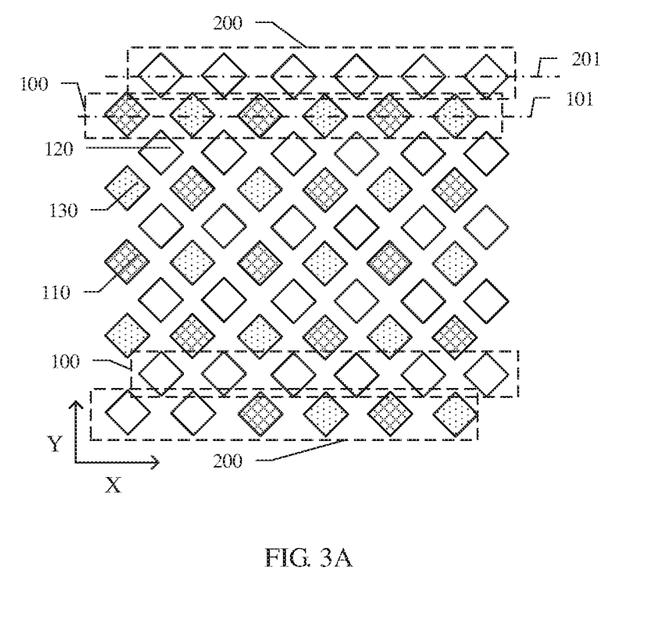
FIG. 3A is a schematic diagram of compensating color cast brightness of a display image illustrated in FIG. 1A.
Figure 3B:
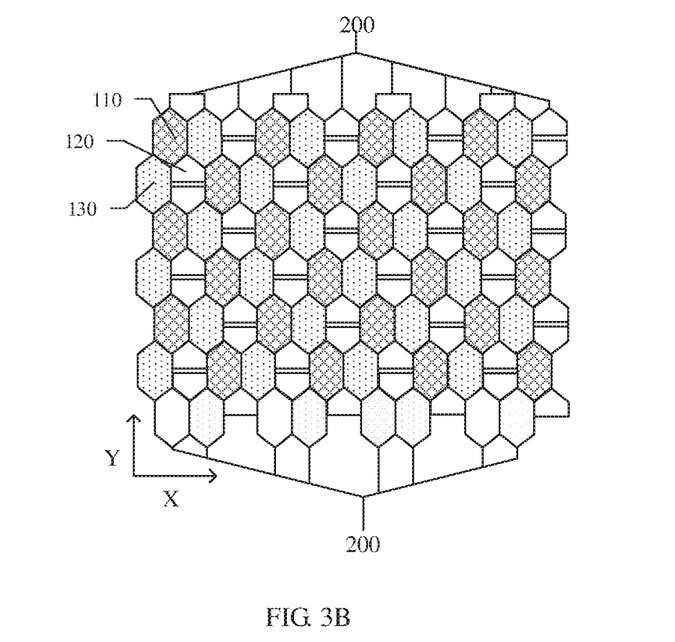
FIG. 3B is a schematic diagram of compensating color cast brightness of a display image illustrated in FIG. 1B.

For example, FIG. 3A is a schematic diagram of compensating color cast brightness of a display image illustrated in FIG. 1A, and FIG. 3B is a schematic diagram of compensating color cast brightness of a display image illustrated in FIG. 1B. As illustrated in FIG. 1A, FIG. 1B, FIG. 3A, and FIG. 3B, in another example of the present embodiments, a step of compensating the color cast brightness to obtain the compensation brightness includes: adjusting brightness of a second sub-pixel group 200, outside the display image and adjacent to the first sub-pixel group 100, until color cast of the boundary of the display image is corrected. The enhanced brightness of the second sub-pixel group 200 is the compensation brightness, and the second sub-pixel group 200 comprises one row of a plurality of sub-pixels have a color complementary to a color of the sub-pixels in the first sub-pixel group 100.

For example, in a case where the first sub-pixel group 100 is the first row of the sub-pixels 101 illustrated in FIG. 1A and FIG. 1B, the first sub-pixel group 100 includes the red sub-pixels 110 and the blue sub-pixels 130 in an alternate arrangement along the X direction. Thus, the color of the boundary where the first sub-pixel group 100 is located is shifting to purple. In order to alleviate the color cast phenomenon at that location, the brightness of the second sub-pixel group 200 needs to be adjusted. In this case, the second sub-pixel group 200 is one row of a plurality of green sub-pixels 120 arranged along the X direction, that is, enhanced brightness of the second sub-pixel group 200 is the compensation brightness in a case where the brightness of the second sub-pixel group 200 is adjusted until the color cast at the boundary of the display image is corrected.

For example, the first sub-pixel group 100 may also be the last row of the sub-pixels 102 illustrated in FIG. 1A and FIG. 1B. Because the first sub-pixel group 100 comprises a plurality of green sub-pixels 120, the color of the boundary where the first sub-pixel group 100 is located is shifting to green. In order to alleviate the color cast phenomenon at that location, the brightness of the second sub-pixel group 200 needs to be adjusted. In this case, the second sub-pixel group 200 is one row of red sub-pixels 110 and blue sub-pixels 130 in an alternate arrangement along the X direction.

The above method for adjusting the brightness of the second sub-pixel group 200 can allow the brightness of one row of the sub-pixels in the second sub-pixel group 200 to be exactly balance out the brightness of the first sub-pixel group 100, thereby correcting the color cast at the boundary of the display image.

For example, as illustrated in FIG. 3A, a first central line 101 formed by brightness centers of the sub-pixels in the first sub-pixel group 100 and a second central line 201 formed by brightness centers of the sub-pixels in the second sub-pixel group 200 do not coincide, that is, the brightness centers of the red sub-pixels 110, the green sub-pixels 120, and the blue sub-pixels 130 arranged along the row (column) direction are not located in one central line.

For example, the value of the color cast brightness is L1, the value of the compensation brightness is L2, and a relationship between L2 and L1 is: $L2=K*L1$, where K is a value calculated according to a proportional relationship of red sub-pixels, green sub-pixels and blue sub-pixels in a case where the red sub-pixels, the green sub-pixels and the blue sub-pixels provide a white color upon the white balance adjustment (i.e., subsequent to the gamma adjustment) of the screen of the display panel.

For example, in forming the white light, a relationship of the number of red sub-pixels:the number of green sub-pixels:the number of blue sub-pixels satisfies a proportion of 3:6:1. In a case where the first sub-pixel group 100 illustrated in FIG. 3A is one row of green sub-pixels 120, the second sub-pixel group 200 to be adjusted includes red sub-pixels 110 and blue sub-pixels 130, so that K satisfies a relationship of $K=(1+3)/6$, and L2 satisfies a relationship of $L2=(4/6)*L1$. In a case where the first sub-pixel group 100 illustrated in FIG. 3A is one row of red sub-pixels 110 and blue sub-pixels 130 in an alternate arrangement, the second sub-pixel group 200 to be adjusted includes green sub-pixels 120, so that K satisfies a relationship of K=6/(1+3), L2=(6/4)*L1.

For example, in a case where the periphery of the display image is black, the second sub-pixel group 200 also displays black, that is, the second sub-pixel group 200 does not emit light. A step of adjusting the brightness of the second sub-pixel group 200 includes allowing the second sub-pixel group 200 to emit light, and the corrected brightness of the second sub-pixel group 200 is the compensation brightness.

For example, a step of obtaining the compensation gray level corresponding to the compensation brightness in the above example includes: adjusting a second initial gray level of the second sub-pixel group to a second corrected gray level to allow the brightness of the second sub-pixel group to be increased by the compensation brightness. The compensation gray level is a difference between the second corrected gray level and the second initial gray level.

For example, the second corrected gray level is a gray level corresponding to the brightness after the brightness of the second sub-pixel group is increased by the compensation brightness, and the second corrected gray level can be obtained by detection.

For example, the second initial gray level of the second sub-pixel group can be increased by the compensation gray level, thereby allowing the brightness of the second sub-pixel group to be increased by the compensation brightness to balance out the color cast brightness of the first sub-pixel group, so as to achieve a purpose of correcting the color cast.

For example, in a case where the region outside the display image is a black image, the gray level of the second sub-pixel group is adjusted from the second initial gray level (that is, 0) to the compensation gray level, thereby allowing the brightness of the second sub-pixel group to balance out the color cast brightness of the first sub-pixel group, so as to achieve a purpose of correcting the color cast.

For example, in the present embodiments, the value of the compensation brightness can be obtained through calculation, or the value of the compensation brightness which allows the first sub-pixel group to no longer appear the color cast can be obtained through a large number of experimental operations.

As illustrated in FIG. 2, the modeling phase further includes the following steps.

The step S105: establishing a correspondence between the first initial gray level and the compensation gray level.

For example, in an example of the present embodiments, a step of establishing the correspondence between the first initial gray level and the compensation gray level may include: fitting the first initial gray level and the compensation gray level to obtain a compensation function.

For example, the one-to-one correspondence is established between the first initial gray level Gray 0 obtained in the above step and the compensation gray level Gray 1 obtained by adjusting the gray level of the first sub-pixel group in the above step, and the fitting function Gray $1=f_1$ (Gray 0) is obtained by fitting the first initial gray level Gray 0 and the compensation gray level Gray 1.

For example, the one-to-one correspondence is established between the first initial gray level Gray 0 obtained in the above step and the compensation gray level Gray 2 obtained by adjusting the gray level of the second sub-pixel group in the above step, and the fitting function Gray $2=f_2$ (Gray 0) is obtained by fitting the first initial gray level Gray 0 and the compensation gray level Gray 2.

For example, in another example of the present embodiments, a step of establishing the correspondence between the first initial gray level and the compensation gray level may include: allowing the first initial gray level and the compensation gray level to be in a one-to-one correspondence to establish a look-up table.

For example, the modeling phase further includes: writing the correspondence into an integrated circuit (IC) of the display panel.

For example, the fitting function or the look-up table can be stored in the memory of the display panel, and can be read from the memory by the display panel when needed. The memory may include one or more computer program products, and the computer program product may include various forms of computer readable storage mediums, such as the volatile memory and/or non-volatile memory.

The modeling phase described above is a phase of establishing the correspondence between the first initial gray level and the compensation gray level. In the modeling phase, a large number of experimental operations are performed on at least one display panel to establish a model of the gray level and the color cast degree, and the model is converted to a color cast correction algorithm integrated into the integrated circuit. The model established based on the modeling phase can be applied to the display panel, used for display, where the boundary of the display image appears the color cast, so as to perform real-time correction on the boundary, where the color cast occurs, of the display image, thereby alleviating the phenomenon that a color shifts to green or purple at the boundary of the display image.

For example, the modeling phase described above may be established prior to the display panel being provided from the factory, or may be established subsequent to the display panel being provided from the factory.

Figure 4A:
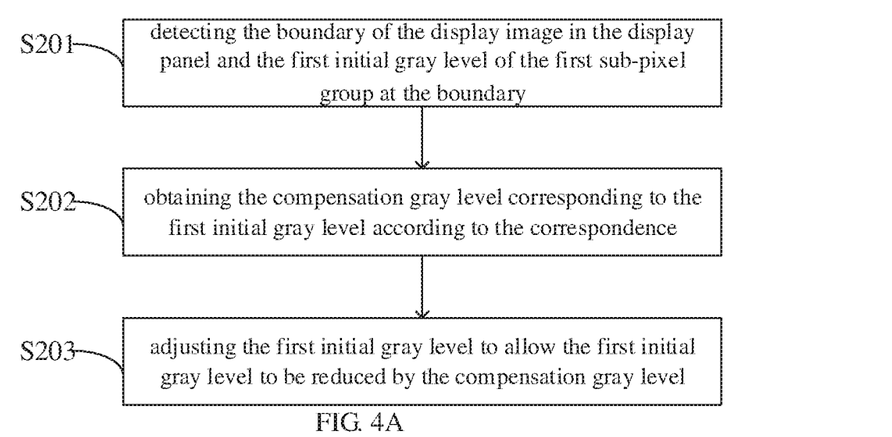
FIG. 4A is a schematic flowchart of steps in a compensation phase provided by an example of an embodiment of the present disclosure.

For example, the color compensation method provided by the present embodiments further includes a compensation phase. FIG. 4A is a schematic flowchart of steps in a compensation phase provided by an example of the present embodiments. As illustrated in FIG. 4A, the specific steps are as follows.

The step S201: detecting the boundary of the display image in the display panel and the first initial gray level of the first sub-pixel group at the boundary.

The step S202: obtaining the compensation gray level corresponding to the first initial gray level according to the correspondence.

The step S203: adjusting the first initial gray level to allow the first initial gray level to be reduced by the compensation gray level.

For example, a step of applying the model established in the modeling phase described above to perform real-time correction on the boundary of the display image in the display panel being used for display includes: detecting the boundary and the gray level of the display image.

For example, a step of detecting the boundary of the display image includes: setting a boundary gray level threshold; detecting an input gray level of each row of sub-pixels in the display image; and comparing the input gray level with the boundary gray level threshold, and determining a row of sub-pixels as the boundary of the display image in a case where the input gray level corresponding to the row of sub-pixels is less than the boundary gray level threshold. In this case, the sub-pixels corresponding to the input gray level less than the boundary gray level threshold is the first sub-pixel group.

For example, in practical applications, the boundary threshold can be set according to the color cast degree acceptable to the human eye.

For example, a step of detecting the input gray level of each row of sub-pixels in the display image may include: reserving two line-buffers in the integrated circuit of the display panel. The two line-buffers include a first line-buffer and a second line-buffer, the first line-buffer is used to store the boundary threshold, and the second line-buffer is used to store and detect the input gray level (that is, the gray level data signal, corresponding to one row, in the second line-buffer used for storing the display image) corresponding to one row of sub-pixels of the entire display image (the area of the entire display image includes the region of the displayed image and the region of the image outside the displayed image) in the display panel. The gray level data signals corresponding to each row of the display image are sequentially input into the second line-buffer, and the gray levels input into the second line-buffer are sequentially compared with the boundary threshold in the first line-buffer. In a case where the gray level in the second line-buffer is less than the boundary threshold, it is determined that the row of sub-pixels corresponding to the gray level in the second line-buffer is the boundary of the display image, that is, the gray level input into the second line-buffer is the first initial gray level of the first sub-pixel group.

For example, in determining the first sub-pixel group located at the boundary of the display image, the first initial gray level of the first sub-pixel group is recorded.

For example, in a case where the region outside the displayed image is a black image, the steps of detecting the boundary of the display image in the display panel may further be: detecting input gray levels of two adjacent rows of sub-pixels in the display image, where an input gray level of a first row of sub-pixels is a first gray level, and an input gray level of a second row of sub-pixels is a second gray level; and comparing the first gray level with the second gray level, and determining one row of sub-pixels corresponding to the second gray level as the boundary of the display image in a case where the first gray level is 0 and the second gray level is not 0.

For example, two line-buffers are reserved in the integrated circuit of the display panel, and the two line-buffers include the first line-buffer and the second line-buffer. The gray level data signals corresponding to each row of the entire display image (the area of the entire display image includes the region of the displayed image and the region of the black image outside the displayed image) in the display panel are sequentially input into the two line-buffers, and the first line-buffer and the second line-buffer respectively store the input gray levels corresponding to two adjacent rows. The gray level data signals, corresponding to the two adjacent rows, stored in the first line-buffer and the second line-buffer are compared. In a case where the input gray level in the first line-buffer is 0 and the input gray level in the second line-buffer is not 0, the row of sub-pixels corresponding to the input gray level in the second line-buffer is determined as the boundary of the display image, that is, the gray level input into the second line-buffer is the first initial gray level of the first sub-pixel group. The order of the input gray levels in the first line-buffer and the second line-buffer is not limited in the present embodiments. For example, in a case where the input gray level in the first line-buffer is 0 and the input gray level in the second line-buffer is not 0, the row of sub-pixels corresponding to the input gray level in the second line-buffer is determined as the upper boundary or lower boundary of the display image.

For example, after determining the boundary of the display image, a compensation method for compensating the color cast is selected.

For example, when the color cast appears, the brightness of the first sub-pixel group located at the boundary of the display image is the color cast brightness. The compensation method may include adjusting the brightness of the first sub-pixel group to reduce the compensation brightness (where the value of the compensation brightness is the value of the color cast brightness), that is, the brightness of the first sub-pixel group is attenuated to implement the correction of the color cast appearing at the boundary of the display image.

For example, a compensation function or a look-up table (i.e., the correspondence) for weakening the brightness of the first sub-pixel group is called in the integrated circuit, and the compensation gray level corresponding to the first initial gray level of the first sub-pixel group is obtained according to the correspondence. Then the first initial gray level is adjusted to reduce the compensation gray level, so that the brightness of the first sub-pixel group is reduced by the compensation brightness, thereby allowing the color cast at the boundary of the display image to be corrected.

Figure 4B:
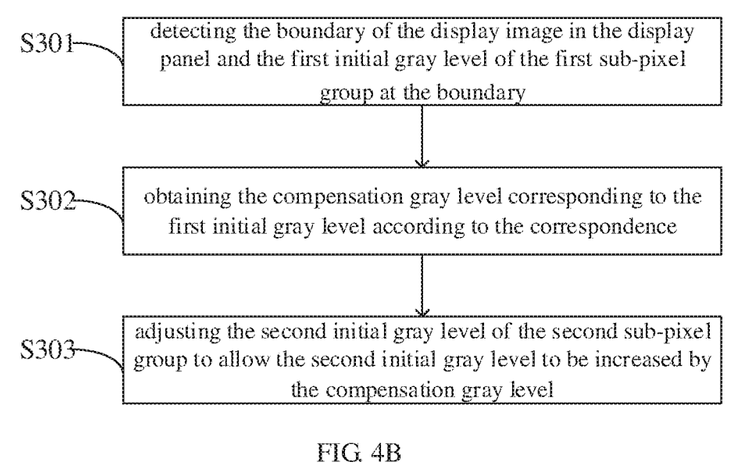
FIG. 4B is a schematic flowchart of steps in a compensation phase provided by another example of an embodiment of the present disclosure.

For example, FIG. 4B is a schematic flowchart of steps in a compensation phase provided by another example of the present embodiments. As illustrated in FIG. 4B, the specific steps are as follows.

The step S301: detecting the boundary of the display image in the display panel and the first initial gray level of the first sub-pixel group at the boundary.

The step S302: obtaining the compensation gray level corresponding to the first initial gray level according to the correspondence.

The step S303: adjusting the second initial gray level of the second sub-pixel group to allow the second initial gray level to be increased by the compensation gray level.

The difference of the steps in the compensation phase between the present example and the example illustrated in FIG. 4B is that the compensation method selected in the present example is to adjust the brightness of the second sub-pixel group, located outside the display image and adjacent to the first sub-pixel group, to allow the color cast at the boundary of the display image to be corrected.

For example, in a case where the periphery of the displayed image is black, the second sub-pixel group also displays black (that is, the second sub-pixel group does not emit light). The compensation function or the look-up table (i.e., the correspondence) for adjusting the brightness of the second sub-pixel group is called in the integrated circuit. According to the correspondence, the gray level of the second sub-pixel group is adjusted from the second initial gray level (that is, 0) to the compensation gray level, so that the brightness of the second sub-pixel group is increased to the compensation brightness to balance out the color cast brightness of the first sub-pixel group, so as to achieve the purpose of correcting the color cast.

For example, in a case where the periphery of the display image is non-black, the compensation function or the look-up table (i.e., the correspondence) for adjusting the brightness of the second sub-pixel group is called in the integrated circuit. According to the correspondence, the second initial gray level of the second sub-pixel group is increased by the compensation gray level, so that the brightness of the second sub-pixel group is increased by the compensation brightness to balance out the color cast brightness of the first sub-pixel group, so as to achieve the purpose of correcting the color cast.

The above compensation phase is to apply the correspondence, obtained in the modeling phase, between the first initial gray level and the compensation gray level to the display panel, being used for display, where the color cast occurs at the boundary of the display image, so as to achieve the purpose of performing real-time correction on the color cast phenomenon at the boundary of the display image to output the compensation image. The above modeling phase is a color cast correction algorithm obtained by performing a plurality of experiments on at least one display panel. The color cast correction algorithm can be applied to any display panel, where the color cast occurs, different from the display panels described above. Therefore, the above compensation phase is a phase where the modeling phase is applied.

Figure 5:
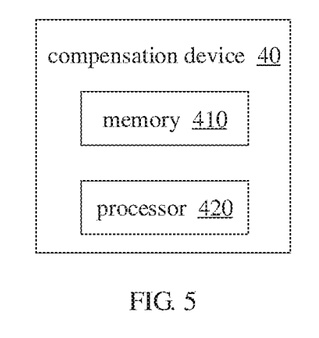
FIG. 5 is a block diagram of a compensation device provided by another embodiment of the present disclosure.

For example, FIG. 5 is a block diagram of a compensation device provided by another embodiment of the present disclosure. As illustrated in FIG. 5, the compensation device 40 includes: a memory 410 configured to store non-volatile computer readable instructions; and a processor 420 configured to execute the non-volatile computer readable instructions. The non-volatile computer readable instructions when executed by the processor perform the color compensation method described above.

For example, the processor 420 and the memory 410 are interconnected through a communication bus system and/or other forms of connecting mechanisms (not shown). It should be noted that the components and structures of the compensation device illustrated in FIG. 5 are only exemplary and not limited. The compensation device may also have other components and structures according to requirements.

For example, the processor 420 may be a central processing unit (CPU) or other forms of processing units having data processing capabilities and/or program executing capabilities, such as a graphics processing unit (GPU), a field programmable gate array (FPGA), or a tensor processing unit (TPU).

For example, the memory 410 may include any combination of one or more computer program products, and the computer program product may include various forms of computer readable storage mediums, such as volatile memories and/or non-volatile memories.

Figure 6:
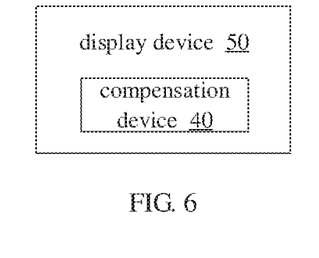
FIG. 6 is a block diagram of a display device provided by another embodiment of the present disclosure.

For example, FIG. 6 is a block diagram of a display device provided by another embodiment of the present disclosure. As illustrated in FIG. 6, the display device 50 includes the compensation device 40 provided by the embodiments described above. When the color cast occurs at the boundary of the display image displayed in the display panel, the boundary of the display image is corrected by applying the compensation device 40 described above to alleviate the color cast phenomenon.

For example, the display device may be a display component such as a liquid crystal display device, an organic light-emitting diode (OLED) display device, and may be any product or component, which includes the above display device, having a display function, for example, a television, a digital camera, a mobile phone, a watch, a tablet computer, a notebook computer, a navigator, etc. The embodiments of the present disclosure are not limited in this aspect.

The following statements should be noted:

(1) Unless otherwise defined, the same reference numeral represents the same meaning in the embodiments of the disclosure and accompanying drawings.

(2) The accompanying drawings involve only the structure(s) in connection with the embodiment(s) of the present disclosure, and other structure(s) can be referred to common design(s).

(3) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed therebetween.

What have been described above are only specific implementations of the present disclosure, the protection scope of the present disclosure is not limited thereto, and the protection scope of the present disclosure should be based on the protection scope of the claims.

What is claimed is:

1. A color compensation method, comprising: a modeling phase,
   wherein the modeling phase comprises:
   obtaining color cast brightness of a first sub-pixel group at a boundary of a display image in a display panel upon different gray levels being input;
   obtaining a first initial gray level of the first sub-pixel group;
   compensating the color cast brightness to obtain compensation brightness;
   obtaining a compensation gray level corresponding to the compensation brightness; and
   establishing a correspondence between the first initial gray level and the compensation gray level,
   wherein the first sub-pixel group comprises a plurality of sub-pixels of at least one color in one row,
   wherein compensating the color cast brightness to obtain the compensation brightness, comprises: adjusting brightness of a second sub-pixel group, outside the display image and adjacent to the first sub-pixel group, until color cast of the boundary of the display image is corrected,
   wherein enhanced brightness of the second sub-pixel group is the compensation brightness; and the second sub-pixel group comprises one row of sub-pixels, and the one row of sub-pixels have a color complementary to a color of the plurality of sub-pixels in the first sub-pixel group,
   wherein a first central line formed by brightness centers of the sub-pixels in the first sub-pixel group and a second central line formed by brightness centers of the sub-pixels in the second sub-pixel group do not coincide,
   wherein a value of the color cast brightness is L1, a value of the compensation brightness is L2, and a relationship between L2 and L1 is:

$L2=K*L1$, wherein K is a value calculated according to a proportional relationship of red sub-pixels, green sub-pixels and blue sub-pixels in a case where the red sub-pixels, the green sub-pixels and the blue sub-pixels provide a white color.

2. The color compensation method according to claim 1, wherein compensating the color cast brightness to obtain the compensation brightness, comprises:
   reducing brightness of the first sub-pixel group until color cast of the boundary of the display image is corrected,
   wherein reduced brightness of the first sub-pixel group is the compensation brightness.

3. The color compensation method according to claim 2, wherein a value of the compensation brightness is equal to a value of the color cast brightness.

4. The color compensation method according to claim 2, wherein obtaining the compensation gray level corresponding to the compensation brightness, comprises:
adjusting the first initial gray level to a first corrected gray level to allow the brightness of the first sub-pixel group to be reduced by the compensation brightness,
wherein the compensation gray level is a difference between the first initial gray level and the first corrected gray level.

5. The color compensation method according to claim 1, wherein obtaining the compensation gray level corresponding to the compensation brightness, comprises:
adjusting a second initial gray level of the second sub-pixel group to a second corrected gray level to allow the brightness of the second sub-pixel group to be increased by the compensation brightness,
wherein the compensation gray level is a difference between the second corrected gray level and the second initial gray level.

6. The color compensation method according to claim 1, wherein establishing the correspondence between the first initial gray level and the compensation gray level, comprises:
fitting the first initial gray level and the compensation gray level to obtain a compensation function.

7. The color compensation method according to claim 1, wherein establishing the correspondence between the first initial gray level and the compensation gray level comprises:
allowing the first initial gray level and the compensation gray level to be in a one-to-one correspondence to establish a look-up table.

8. The color compensation method according to claim 2, further comprising: a compensation phase,
wherein the compensation phase comprises:
detecting the boundary of the display image in the display panel and the first initial gray level of the first sub-pixel group at the boundary;
obtaining the compensation gray level corresponding to the first initial gray level according to the correspondence; and
adjusting the first initial gray level to reduce the compensation gray level.

9. The color compensation method according to claim 1, further comprising: a compensation phase,
wherein the compensation phase comprises:
detecting the boundary of the display image in the display panel and the first initial gray level of the first sub-pixel group at the boundary;
obtaining the compensation gray level corresponding to the first initial gray level according to the correspondence; and
adjusting the second initial gray level of the second sub-pixel group to increase the compensation gray level.

10. The color compensation method according to claim 8, wherein detecting the boundary of the display image in the display panel, comprises:
setting a boundary gray level threshold;
detecting an input gray level of each row of sub-pixels in the display image; and
comparing the input gray level with the boundary gray level threshold, and determining one row of the sub-pixels as the boundary of the display image in a case where the input gray level corresponding to the row of the sub-pixels is less than the boundary gray level threshold.

11. The color compensation method according to claim 8, wherein detecting the boundary of the display image in the display panel, comprises:
detecting input gray levels of two adjacent rows of sub-pixels in the display image, wherein an input gray level of a first row of the sub-pixels is a first gray level, and an input gray level of a second row of the sub-pixels is a second gray level; and
comparing the first gray level with the second gray level, and determining the second row of sub-pixels corresponding to the second gray level as the boundary of the display image in a case where the first gray level is 0 and the second gray level is not 0.

12. The color compensation method according to claim 1, wherein the display panel comprises a pixel arrangement structure,
the pixel arrangement structure comprises a plurality of first color sub-pixels, a plurality of second color sub-pixels, and a plurality of third color sub-pixels,
the first color sub-pixels and the second color sub-pixels are in an identical row, and
the third color sub-pixels constituting pixels with at least part of the plurality of first color sub-pixels and at least part of the plurality of second color sub-pixels in the identical row are in another row.

13. The color compensation method according to claim 12, wherein the plurality of first color sub-pixels, the plurality of second color sub-pixels, and the plurality of third color sub-pixels are arranged as a plurality of first repeating units and a plurality of second repeating units;
each of the plurality of first repeating units comprises one of the plurality of first color sub-pixels and one of the plurality of third color sub-pixels, and each of the second repeating units comprises one of the plurality of second color sub-pixels and one of the plurality of third color sub-pixels;
the plurality of first repeating units and the plurality of second repeating units are in an alternate arrangement along a first direction and a second direction, respectively, and the first direction intersects the second direction;
the plurality of first color sub-pixels and the plurality of second color sub-pixels are in an alternate arrangement along the first direction and the second direction, respectively; and
the plurality of third color sub-pixels are in an array arrangement along the first direction and the second direction, and every four of the plurality of third color sub-pixels are around one of the plurality of first color sub-pixels or one of the plurality of second color sub-pixels,
wherein the first sub-pixel group comprises one row of the plurality of first color sub-pixels and the plurality of second color sub-pixels in an alternate arrangement, or comprises one row of the plurality of third color sub-pixels.

14. The color compensation method according to claim 12, wherein the plurality of first color sub-pixels, the plurality of second color sub-pixels, and the plurality of third color sub-pixels are arranged as a plurality of first repeating units and a plurality of second repeating units;
each of the plurality of first repeating units comprises one of the plurality of first color sub-pixels and one of the plurality of third color sub-pixels, and each of the second repeating units comprises one of the plurality of second color sub-pixels and one of the plurality of third color sub-pixels;

the plurality of first repeating units and the plurality of second repeating units are in an alternate arrangement along a first direction to form a plurality of repeating unit groups, the plurality of repeating unit groups are arranged along a second direction, adjacent ones of the plurality of repeating unit groups are staggered from each other along the first direction, and the first direction intersects the second direction; and in each of the plurality of repeating unit groups, the first color sub-pixel of each of the first repeating units, the second color sub-pixel and the third color sub-pixel of each of the second repeating units are in an identical row, and the third color sub-pixel of each of the first repeating units is in another row, wherein the first sub-pixel group comprises one row of the plurality of first color sub-pixels and the plurality of second color sub-pixels, or comprises one row of the plurality of third color sub-pixels.

15. A compensation device, comprising:

a memory, configured to store non-volatile computer readable instructions; and a processor, configured to execute the non-volatile computer readable instructions, wherein the non-volatile computer readable instructions, when executed by the processor, perform the color compensation method according to claim 1.

16. A display device, comprising the compensation device according to claim 15.

* * * * *